Jan. 25, 1966 S. KNIGHT 3,230,825

CENTRALIZED VISUAL TAPE DECK

Filed Feb. 5, 1962 2 Sheets-Sheet 1

INVENTOR.
SIDNEY KNIGHT
BY
Robert A. Sloman
ATTORNEY

Jan. 25, 1966 S. KNIGHT 3,230,825

CENTRALIZED VISUAL TAPE DECK

Filed Feb. 5, 1962 2 Sheets-Sheet 2

INVENTOR.
SIDNEY KNIGHT

BY

Robert Q. Sloman
ATTORNEY 3,230,825
CENTRALIZED VISUAL TAPE DECK

Sidney Knight, Detroit, Mich., assignor to Instructomatic, Inc., Detroit, Mich., a corporation of Michigan Filed Feb. 5, 1962, Ser. No. 171,094
2 Claims. (Cl. 88—28)

The present invention relates to synchronizing audio and video portions on a magnetic tape or film, particularly adapted for student instruction in foreign languages, other courses, or for display, advertising or entertainment purposes. And more particularly wherein the student or other listener will hear the lesson source in his earphones, or other speaker, and will also receive a visual picture in black and white, or in color upon a small screen with said picture perfectly synchronized with the audio source.

Therefore, it is a primary object of the present invention to provide a novel apparatus for synchronizing audio and video portions on a magnetic tape or film by which a student or other observer will receive the audio portion from the tape or film as it passes through a playback head forming a part of a tape transport mechanism and simultaneously therewith will have a direct view of a synchronized picture corresponding to said audio portion, and by utilizing the listener's sense of sight and sound, there is produced a lasting impression to thus provide an improved means of teaching or presentation.

It is an object of the present invention to provide a student's language laboratory booth, or other study booth, which is equipped with a visual type tape deck wherein the student merely threads a magnetic tape with the lesson source through the conventional playback head of the tape transport mechanism, and wherein as a part of the magnetic tape or film, or combination tape and film, there are provided thereon a series of longitudinally spaced individual pictures, photographs, drawings, written or printed matter which may be directly viewed by the student through a suitable aperture in a housing, or projected upon a screen, and wherein the pictures are individually synchronized with the corresponding audio source.

It is another object of the present invention to provide apparatus for synchronizing audio and video portions on a magnetic tape or film and wherein the audio portion of the film is continuously fed past a playback head of a tape recorder or tape transport mechanism, and wherein the leading video portion of the film is intermittently stopped to provide a unit picture at an aperture or the projection of a unit picture and wherein during stoppage of the film, a takeup loop in the film is formed in advance of the video pickup means to thus accommodate the continuously moving film from the playback head.

It is a further object of the present invention to provide a control mechanism which incorporates a tape transport mechanism with the usual feed reel and takeup reel or cartridge type or endless loop type and in conjunction therewith a magnetic tape having a portion thereof with sound recordings thereon and another portion of a translucent or transparent character which has a series of longitudinally spaced pictures, drawings, photographs or printed material thereon which are normally longitudinally spaced from the corresponding audio recording, and which are adapted for visual synchronization therewith.

It is contemplated that the said mechanism provides a means by which the film or tape is first passed through the audio playback head to pick up the audio portion of the film, and wherein mechanism is provided for feeding the film through a viewing aperture or through the aperture of a projector and for stopping the film momentarily for a determined time lapse to permit the viewing of the picture. Said picture being of a stationary nature either through the said aperture or projector, and wherein the mechanism also incorporates means for stopping the film movement through the viewing mechanism, or projecting mechanism, and for forming intermittently a loop of the continuously movable film as it passes through the playback head.

These and other objects will be seen from the following specification and claims in conjunction with the appended drawings in which:

It will be understood that the above drawings illustrate merely a preferred embodiment of the invention by way of illustration, and that other embodiments are contemplated within the scope of the claims hereafter set forth.

Figures 1, 2:
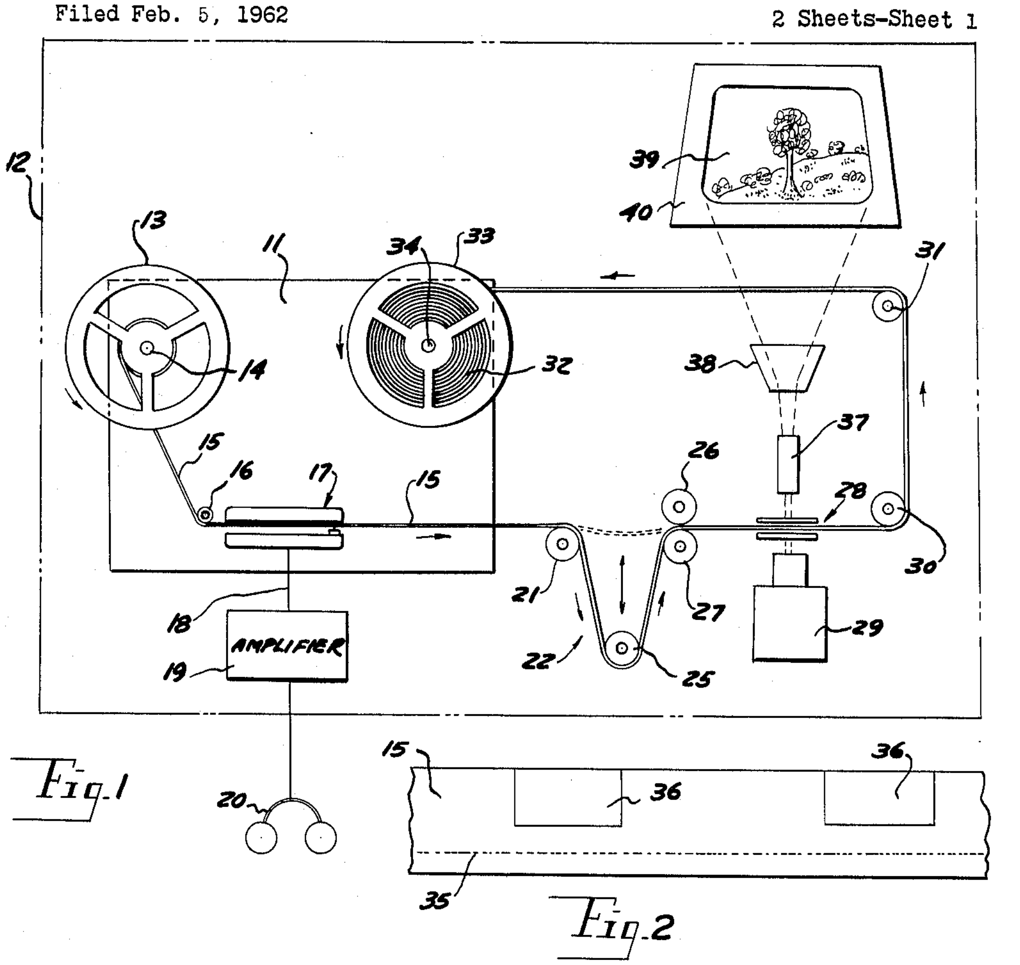
FIG. 1 is a schematic view of the present tape transport assembly and projection means, forming a part of the present invention.
FIG. 2 is a fragmentary view of the form of tape or film employed.

Referring to the drawings within an acoustically insulated student station, for example, such as indicated by phantom lines at 12, there is shown in FIG. 1, a standard type of tape deck 11 corresponding to a conventional tape transport assembly which includes feed reel 13, journaled at 14 upon the deck, which has wound therearound a special type of magnetic tape or film having a portion, as indicated at 35, FIG. 2, upon which an audio recording has been applied, and which also has a second portion forming a part of the film assembly, which consists of a series of longitudinally spaced individual pictures 36, which may be drawings, photographs, written or printed matter, and which form a part of a transparent or translucent film element capable of projection by a suitable projector upon a screen. These pictures also are adapted for direct viewing from the tape.

For explanation purposes, the language laboratory booth, or other student booth, usually represents an acoustically insulated area in which a student is seated, and wherein access is had to a tape deck 11, upon which is mounted a conventional or modified tape assembly, feed reel 13, magnetic tape 15 and takeup reel 33. The tape deck also incorporates a conventional audio playback head 17 suitably connected at 18 to an amplifier 19 in turn connected to the earphones 20, or a loudspeaker by which a student sitting within the student booth or other display area 12, or adjacent thereto, may listen to the audio portion 35 of the tape 15, as it moves past the playback head 17, forming a part of the tape transport assembly.

The student merely threads the tape 15 with the lesson source 35 thereon through the said playback head 17, the said tape containing a lesson source, which he is to listen to and also a blank area upon which the student may record responses, if desired. The primary difference in the present tape 15 is that it may be double the width of the convention 8-millimeter tape, and in the illustrative embodiment is 16-millimeters in width, with a portion of the said tape including the recording 35, being of the magnetic recording type and wherein the other portion of the tape will have a transparent or translucent base upon which will be drawings or photographs of the still picture type, and which are longitudinally spaced from the corresponding audio portion 35, and adapted for perfect synchronization therewith.

For example, when the student hears the statement in the earphones, "Mary drove to the Eiffel Tower," the student will also see a picture of a girl when the word "Mary" is heard on the earphones, a picture of Mary driving a car at the word "drove to the," and the word "Eiffel Tower" will be synchronized with a picture of the Eiffel Tower. Accordingly, audio and video portions of the tape are perfectly synchronized, and will so remain throughout use in the present apparatus and by virtue of the method hereafter described.

The ordinary spindles on the tape deck 11 are the same substantially as in conventional tape transports, except that the spindles may be of such size as to accommodate 16-mm., reels 13 and 33 and will be slotted in a conventional manner in order to receive the projection type of reel.

Figures 4, 5:
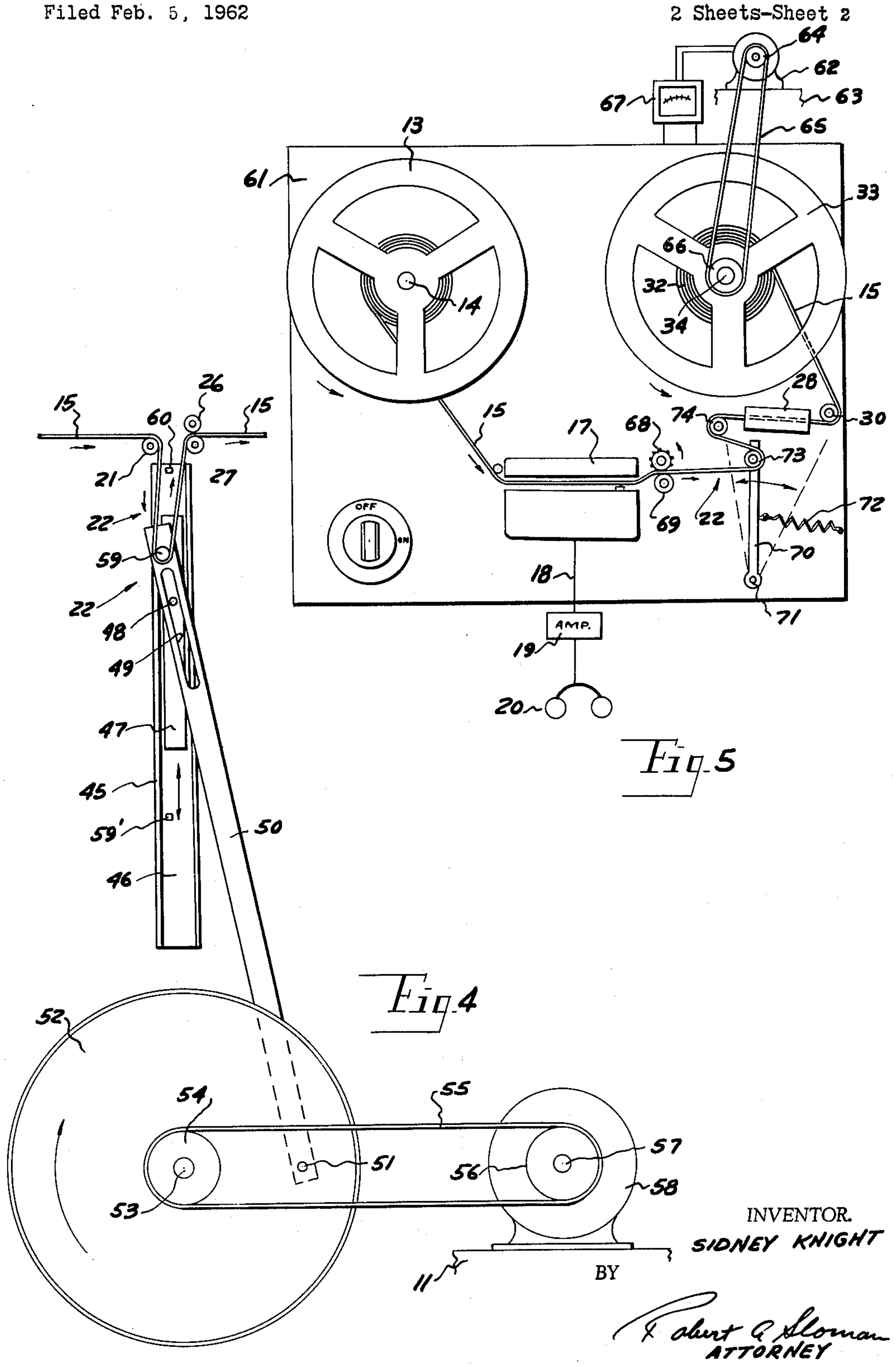
FIG. 4 is a fragmentary view on an enlarged scale illustrating one form of pulsating arm structure for intermittently forming a film loop in the present invention.
FIG. 5 is a schematic view corresponding partially to FIG. 1 showing another form of spring biased pulsating arm for forming a film loop between the audio and video pickup means, forming a part of the present invention.

The combination film-tape, hereafter referred to either as film, tape, or film tape, is threaded in a conventional manner through the playback area 17, and as shown in FIG. 1, will branch off to the visual equipment, which consists of a pulsating arm assembly to define a loop portion, as generally indicated at 22. Such a pulsating arm, for illustrating, is shown in FIG. 4, as one means for forming the loop 22 in the film in the manner and for the purpose hereafter described.

It is contemplated that many mechanisms may be employed for forming the specific loop in the film, as designated at 22, because it is contemplated that during continuous movement of the film, or tape, through the playback head 17, there will be an interrupted movement of the said tape as it passes through the aperture 28 of a form of light projector 29.

In the illustrative embodiment of the invention, as generally shown first at FIG. 1, the film 15 passes around the drive roller 21, or idler, and into the pulsating section 22 around the guide pulley 25, and thence between the guide or locking rollers 26 and 27, for threading through the aperture 28 of projector 29.

The pulsating section or loop section 22 is defined by the two extreme positions of the pulsating pulley 25 as it moves between the solid line and dotted line indications of tape 15 shown by the arrow in FIG. 1.

In a manner hereafter described, though the film 15 is passing continuously through the playback head 17, its movement through the aperture 28 must be temporarily interrupted for the projection of an individual picture 36, upon the screen 39. Accordingly, the present pulsating mechanism hereafter described, and generally indicated at 22, FIG. 1, provides a means by which the film is temporarily stopped in advance of the aperture 28 and a loop formed therein, as indicated at 22, during which period there is a takeup of the film, as it is continuously passing through the playback head 17.

After a predetermined viewing period, the pulsating arm assembly, generally indicated at 22, permits the return of the loop controlling pulley 25 to dotted line position, and the film moves rapidly between the guide rollers 26 and 27, and through the aperture 28, around the guide pulleys 30 and 31 and onto the takeup reel 33, which is journaled upon the deck as at 34 to thus form the coil 32 on the said takeup reel.

In operation as the audio portion 35 of the tape 15 passes through the playback head 17, the picture area 36 is stationary at the aperture point 28. The transparent or translucent portion of the film tape is illuminated by the lamp housing 29 forming a part of the projector and is normally focused through the lens 37, banks off the angularly related mirror 38, which in the preferred embodiment is arranged at a 45 degree angle.

The said projected picture thus is applied to the rear surface of the translucent screen 39, mounted upon the suitable framework 40, which is arranged within the student booth 12 for easy viewing.

In accordance with the operation of the present invention, the picture 36 remains at aperture 28 for approximately 2 seconds, for illustration, or for as long as it takes the pulsating arm 50, as shown in FIG. 4 to make one complete reciprocation between its extreme positions.

For illustration, when the pulley 25 previously positioned at one position starts to move forwardly and downwards in FIG. 1, it in effect stops the feed movement of the visual portion of the film through the projector, and the pulley 25 as it moves forms a loop section generally indicated at 22. The period of time which this takes permits a stationary projection or viewing of the picture 36 on the film tape, which is projected upon the screen 39 in the manner above described.

Inasmuch as the film is moving continuously past the playback head 17, in some manner there must be a takeup of this continuously movable film. Accordingly, the loop, as shown at 22, is formed in the said film. When the roller, or pulley 25 arrives at one extreme position the film is now free to move through the aperture 28 with the pulley 25 again returning to its innermost position FIG. 1.

As the said roller 25 moves toward said innermost position, the tape passes through the aperture 28, due to the amount of tension that is always present on the takeup reel 33. By the time the loop forming pulley has returned to innermost position, it will be time to effect a second stoppage of the lead portion of the film within the aperture 28 of the projecting means. This occurs with the recycling of the pulsating assembly which forms the loop 22.

The amount of tape which the roller 25 accumulates as it cycles to its outer position is directly equivalent to the accumulated tape that is continuously passing through the playback head 17. Accordingly, at this precise time, the listener hears a description through his earphones 20 of the visual portion of what is shown on the screen 39. After the picture has been viewed, the film is released by the pulsating arm with the pulley assembly 25 returning from outer position towards inner position, and due to the tension of the takeup reel 33, the tape which theretofore formed the loop 22 is pulled through the aperture 28 too fast for the human eye to scan. This procedure is continued throughout the entire operation with the pulsating loop section 22 alternately formed and eliminated to take up the continuously moving combination tape and film 15, as it leaves the playback head 17.

Figure 3:
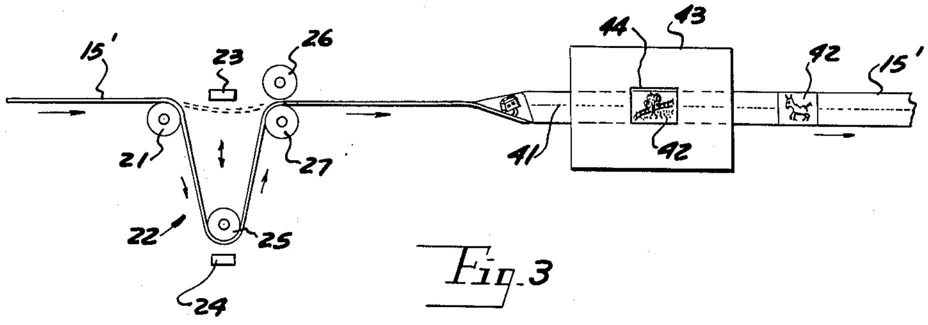
FIG. 3 is a fragmentary view, partially similar to FIG. 1, showing the film passing through an apertured housing for direct viewing of a picture upon the film.

A slightly different form of utilization of the present invention is shown in FIG. 3, which corresponds partially to the loop forming section 22 of FIG. 1, but provides a different means for the viewing of the pictures 42 upon the tape 15'.

In this construction, the projection assembly is omitted entirely and in its place there is provided a viewing housing 43 with an aperture 44 by which successively and intermittently individual pictures or drawings, or photographs 42 may be directly viewed by the observer.

In this case instead of the transparent or translucent tape, a standard tape will be employed, which will be lighter in material as to the base material, such as white, for example, and stamped, printed, or photographed thereon, or by any other suitable means will be applied thereto a picture or other reading material, which may be viewed directly through the aperture 44, as the film intermittently stops in registry therewith.

As above referred to, the formation of the loop 22, shown in FIGS. 1 and 2 must be synchronized with the tape movement 15, so that there is an exact synchronization of the picture 42 at the aperture 44 at the same time that the student is listening to the audio portion of the tape as it passes through the playback head 17.

This pulse action for providing the loop 22 on the tape film may be accomplished in various ways. It is applicant's intention not to limit himself to the particular means and specific structure by which this is accomplished. However, by way of illustration, two means of accomplishing this are shown respectively in FIGS. 4 and 5.

FIG. 4, shows a piston type of pulser, which may be considered as incorporated into the structure of FIG. 1 with the actuating pulley 25 of FIG. 1, corresponding to the actuating pulley 59, journaled at one end portion of the reciprocally movable arm 50, FIG. 4.

With specific reference now to FIG. 4, there is shown a piston type of method for providing the needed pulsating reciprocal movements for defining the loop 22 and for its elimination as desired. There is shown in FIG. 4, an elongated channel type guide 45 with the channel 46 therein which in the illustrative embodiment is arranged substantially at right angles to the path of movement of the film or tape 15.

The elongated slide block 47 is guidably positioned within the channel 45 and is adapted for reciprocal movements therein and includes the upstanding roller 48 which is guidably positioned within the elongated slot 49 adjacent one end portion of the reciprocal arm 50, which carries the tape engaging roller 59 for forming the loop 22, such as shown in FIG. 4. The reciprocal arm 50 derives its power for reciprocal movement through a portion of the power mechanism of the tape deck.

In the illustrative embodiment there is shown a motor 58, mounted on a portion of the tape deck 11, fragmentarily shown in FIG. 4 and whose driveshaft 57 carries the pulley 56 for driving the continuous belt 55, which extends around a corresponding drive pulley 54 upon the axial shaft support 53 for the drive wheel 52. The other end portion of the reciprocal arm 50 is eccentrically joined swivelly as at 51 to a portion of the rotatable drive wheel 52. Accordingly, it is seen that continuous rotary movements of the wheel 52 through the action of the motor 58 will effect a continuous reciprocal movement of the arm 50, whose upper end portion is guidably positioned relative to the channel 45 and whose control pulley 59, adjacent its upper end is adapted for forming the loop 22 intermittently and at the same time permitting release of said loop.

When the arm 50 has been moved to its full in position as indicated at 60, the loop of tape 22 is released and the tape will travel through the viewing aperture 28, as shown in FIG. 1, around the idlers 30 and 31 and onto the takeup reel 33. By the time that the slack in the loop has been fully absorbed, the arm 50 is ready for its next cycle from the position shown at 60, FIG. 4 to the position 59′ with respect to the channel guide 45.

During the period that the arm is traveling from innermost to outermost position, forming the said loop 22, the solid tape 15′ of FIG. 3 or the combination translucent magnetic tape 15 of FIG. 2 is held stationary with the respective pictures 36 or 42 in registry with the viewing aperture 28 of FIG. 1, or viewing aperture 44 of FIG. 3, thus visually revealing the material that is being described in the continuously movable audio portion of the tape as it moves through the playback head 17 of FIG. 1.

It is noted particularly in FIG. 3, as well as in FIG. 4, that certain parts have been duplicated from FIG. 1, and their numbering duplicated and accordingly the description thereof is not repeated.

A slight variation of the present tape deck 11, FIG. 1, is shown in FIG. 5 wherein the tape deck, generally indicated at 61 and wherein certain common parts are found previously described with respect to FIG. 1, as for example the feed reel 13, the tape 15, the mounting 14 for the feed reel, as well as the takeup reel 33 and its mounting.

The assembly of mechanism is substantially the same as above described in the showing of the tape as moving through the playback head 17 which is connected in the same manner to the ear pieces 20 through a suitable amplifier 19, schematically shown.

In this construction, however, there is a slight variation in the means by which the loop 22 is formed. There is applied to this construction a pulsating arm, designated at 70, which is pivotally mounted at 71, upon the tape deck, and is normally spring-biased as at 72 to one of two positions indicated in dotted lines in FIG. 5.

A separate motor 64 is employed for driving the takeup reel 33. For this purpose, the power driven shaft of the motor drives the pulley 64 and the said pulley 64 and belt 65, which through pulley 66 applies a drive as desired to the takeup reel 33.

In this connection, it is noted that the drive to the takeup reel will be intermittent, and this is controlled by the mechanical time switch 67 which operates from the original control mechanism of the tape deck 61, and is so timed as to correspond with and be synchronized with movement of the tape through the playback head 17, and in the timing arrangement which is identical to the piston drive type of reciprocal arm shown in FIG. 4 in order to give the proper amount of exhibit time to the stationary tape during the period that the loop 22 therein is being formed as hereafter described.

In the construction shown in FIG. 5, the film 15 is being fed from the playback head 17 by the capstan or drive sprocket 68, and with respect to the idler 69. The tape is threaded around the idler pulley 73, the additional idler pulley 74 and projects relative to the aperture 28, forming a part of the film projecting means which is diagrammatically shown in FIG. 5, which would normally correspond to the structure, schematically shown in FIG. 1.

The film, as it passes through the aperture 28 extends around another idler 30, and is wound as at 32 upon the film takeup reel 33, and in an intermittent manner, under the control of the motor 62 and timer 67.

The arm 70 being spring loaded at 72, has a tendency to pivot about its pivotal point 71 in a clockwise direction. The primary purpose of this function is to store the tape 22 in the form of a loop in the proper manner to prevent its tangling, inasmuch as the tape is moving continuously at uniform speed through the playback head 17.

At the precise time that the arm 70 is pivoting to the right to the extreme dotted line position shown under the action of the spring 72, the tape 15 remains stationary at the aperture 28 or exhibit area, as better illustrated in more detail in FIG. 1.

When the arm 70 has reached the maximum travel, due to the spring tension 72, the timing device 67 automatically turns on the motor 62, which then has sufficient strength to overcome the spring tension 72 and the arm 70 pivots to the left or in a counterclockwise direction, as the tape or film 15 moves around the idler 73. Thus the tape travels through the aperture section 28 of the exhibit area, too fast for the human eye to interpret, and is collected at 32 upon the takeup reel 33.

At this time, the timing device 67 goes through a similar procedure of shutting off the motor 62. The arm 70 tilts in a clockwise direction, the tape 15 is stopped and this means there is formed the loop 22 to absorb the tape which is being constantly fed past the feed back section 17. The picture material, such as shown at 36, FIG. 2 on the film 15, remains temporarily stationary at the aperture 28 of the projection assembly to give the proper exhibit time to the viewer, and until the arm 70 has reached its maximum position to the dotted line position on the right, as shown in FIG. 5.

In succession, and as above described, when the arm 70 has reached its maximum position to the right, the timer 67 is so designed as to energize the motor 62, for the purpose of absorbing the loop 22 of film. The strength or torsional power of the takeup reel 33 is sufficient to counteract the spring tension 72 and the arm 70, so that the arm 70 again moves to the left hand dotted line position.

The functioning or pulsation movement of the arm 70 is continuous therefore, and the motor 62 is intermittently energized for drawing the film 15 onto the takeup reel. There also are temporary stoppages, of course, of the film at the aperture section 28, which is synchronized with the audio portion of the film, which is being received by the observer through the earpiece 20 from the playback head 17.

It is contemplated as part of the present invention, that there may be numerous other mechanical structures for the intermittent loop 22 and for effecting a timed or intermittent stoppage of the film for projection purposes.

As distinguished from the conventional movie film which is continuously moving, the primary point of importance here is that this is not a movie type of film; that the pictures 36 are individual pictures with the result that the film at the aperture 28 must be temporarily stopped for projection thereof, as shown in FIG. 1 or for direct viewing as shown in FIG. 2.

During this viewing period, of course, the film is continuously moving through the playback head 17 which means that if the film is stopped at the video section, a loop is formed, as at 22, FIGS. 1, 3, 4 and 5. Accordingly, in the preferred embodiment of the invention, several means have been shown by which this loop may be formed and released at the correct timed interval so that there is perfect synchronization of the viewing or projection of the picture 36, FIG. 2, or picture 42 of FIG. 3 to coincide with the audio portion of the tape 15, as it continuously moves through the playback head 17.

Accordingly, with the present disclosure, there is contemplated a method of synchronizing the audio and video portions on a magnetic tape or film which contemplates continuous movement of the recorded audio portion through the playback head and the temporary or intermittent stoppage of the tape at the video pickup means, and accordingly intermittently and alternately operable means for eliminating the loop by moving the leading portion thereof through the video pickup means in a continuous operation.

Whereas in the illustrative description, reference has been made to the use of the invention for instructional purposes as in a language laboratory booth, or the like, it is contemplated that the present invention is not limited thereto. On the other hand, the present invention may be employed for instructional or any other entertainment or advertising purpose wherein it is desired to provide an audio message and synchronized therewith a video message, both from the same film or tape.

Having described my invention, reference should now be had to the following claims.

I claim:

1. In a visual type tape deck having a tape transport mechanism, film-tape guide means;

a movable magnetic film or tape having a portion with a continuous sound recording thereon and another light transmitting portion having a series of longitudinally spaced individual separate and different pictures longitudinally spaced from corresponding audio recordings adapted for visual synchronization therewith;

an audio playback head continually receiving said tape;

a projector spaced from said head including an aperture receiving said tape-film;

said film-tape adapted for movement past said aperture, and for stopping for an appreciable period of time with an individual picture in registry with said aperture;

means stopping the feed movement of the film-tape through said projector for an appreciable period and registry of a single picture with said aperture in synchronism with a corresponding audio portion of film-tape as it moves continuously through said playback head;

said tape or film portion forming a storage loop of progressively increasing length during the period of stoppage of a picture at said aperture;

the means interrupting said feed movement stopping the film-tape in registry with said aperture including a reciprocating arm;

an idler roller on one end of said arm in operative engagement with said film-tape, for intermittently forming the storage take-up loop in the film-tape as the film-tape moves continuously past said playback head;

and power operated means joined to the other end of said arm effecting reciprocal movements thereof.

2. In the tape deck of claim 1, said power operative means including a rotatable disk, said arm at its other end eccentrically connected with said disk.

References Cited by the Examiner

UNITED STATES PATENTS

| | | | |
|---|---|---|---|
| 1,044,028 | 11/1912 | Curtiss | 242—67.2 |
| 1,304,854 | 5/1919 | Clark | 74—84 |
| 1,500,037 | 7/1924 | Reisz | 352—5 |
| 2,080,782 | 5/1937 | Peterson | 352—30 |
| 2,526,516 | 10/1950 | Supitilov | 88—28 |
| 2,551,349 | 5/1951 | Supitilov | 88—28 |

FOREIGN PATENTS

| | | |
|---|---|---|
| 608,549 | 4/1926 | France. |
| 695,041 | 9/1930 | France. |
| 858,233 | 5/1940 | France. |
| 1,191,907 | 4/1959 | France. |
| 10,474 | 1895 | Great Britain. |

EVON C. BLUNK, *Primary Examiner.*

NORTON ANSHER, WILLIAM MISIEK, *Examiners.*